US012782380B2

(12) United States Patent
Isebrand et al.

(10) Patent No.: US 12,782,380 B2
(45) Date of Patent: Nov. 3, 2026

(54) ADDITIVELY MANUFACTURED STRUT FOR AIR DATA PROBE

(71) Applicant: Rosemount Aerospace Inc., Burnsville, MN (US)

(72) Inventors: Scott Isebrand, Minneapolis, MN (US); Greg Seidel, Lakeville, MN (US); Matthew Kulhanek, Apple Valley, MN (US); Rudy Pitera, Inver Grove Heights, MN (US)

(73) Assignee: Rosemount Aerospace Inc. (HSC), Burnsville, MN (US)

( * ) Notice: Subject to any disclaimer, the term of this patent is extended or adjusted under 35 U.S.C. 154(b) by 309 days.

(21) Appl. No.: 18/615,081

(22) Filed: Mar. 25, 2024

(65) Prior Publication Data

US 2025/0298050 A1 Sep. 25, 2025

(51) Int. Cl.
*G01P 5/165* (2006.01)
*B23K 1/00* (2006.01)
*G01P 13/02* (2006.01)

(52) U.S. Cl.
CPC ............ *G01P 5/165* (2013.01); *B23K 1/0016* (2013.01); *G01P 13/025* (2013.01)

(58) Field of Classification Search
CPC ...... G01P 5/165; G01P 13/025; B23K 1/0016
See application file for complete search history.

(56) References Cited

U.S. PATENT DOCUMENTS 5,025,661 A * 6/1991 McCormack ....... G01L 19/0092 73/180
5,731,507 A * 3/1998 Hagen .................. G01K 13/028 73/182
9,849,993 B2 12/2017 Sarno et al.
9,975,639 B2 5/2018 Hodot et al.
10,035,603 B2 7/2018 Sarno et al.
10,183,753 B2 1/2019 Pineau et al.
10,234,475 B2 3/2019 Sarno et al.
10,329,024 B2 6/2019 Hodot et al.
10,472,074 B2 11/2019 Desjardins et al.
10,667,330 B2 5/2020 Sarno et al.
10,884,014 B2 * 1/2021 Golly ...................... G01P 5/165
11,237,031 B2 2/2022 Wigen et al.
11,237,183 B2 * 2/2022 Sanden ................... G01P 5/165
11,428,707 B2 * 8/2022 Johnson .................. G01P 5/165
(Continued)

FOREIGN PATENT DOCUMENTS

CN 109877314 A 6/2019

*Primary Examiner* — Jonathan M Dunlap
(74) *Attorney, Agent, or Firm* — Kinney & Lange

(57) ABSTRACT

A strut for an air data probe includes a socket including a side wall and an end wall. The strut includes a first opening in the socket extending through the end wall of the socket and a second opening in the socket extending through the end wall of the socket and spaced from the first opening. The strut further includes a first pressure path formed within the strut and extending within the strut from the first opening in the socket to a second end of the strut and a second pressure path formed within the strut and extending within the strut from the second opening in the socket to the second end of the strut and spaced from the first pressure path. The strut is monolithic such that the socket, the first opening, the second opening, the first pressure path, and the second pressure path are integral to the strut.

14 Claims, 13 Drawing Sheets

(56) References Cited

U.S. PATENT DOCUMENTS

| | | | | |
|---|---|---|---|---|
| 11,624,637 | B1 * | 4/2023 | Isebrand | G01F 1/46 73/861.65 |
| 11,662,235 | B2 * | 5/2023 | Isebrand | B64D 15/12 73/861.65 |
| 2017/0029125 | A1 | 2/2017 | Sarno et al. | |
| 2017/0106993 | A1 * | 4/2017 | Anderson | B64D 43/02 |
| 2017/0369175 | A1 * | 12/2017 | Gordon | G01P 5/165 |
| 2020/0393484 | A1 * | 12/2020 | Johnson | G01P 1/00 |
| 2021/0181229 | A1 * | 6/2021 | Sanden | G01P 13/025 |
| 2022/0155332 | A1 * | 5/2022 | Sanden | B64D 15/20 |

* cited by examiner

ADDITIVELY MANUFACTURED STRUT FOR AIR DATA PROBE

BACKGROUND

The present disclosure relates to air data probes, and in particular, to struts of air data probes.

Air data probes are installed on an aircraft to measure air data parameters. Air data probes are mounted to an exterior of the aircraft via a mounting flange. A strut extends from the mounting flange to hold a sensing head of the air data probe away from the fuselage of the aircraft. The sensing head is exposed to the external airflow. The air data probe samples air from the surrounding external airflow at the sensing head and communicates pressures pneumatically through the strut to a location where air data parameters are generated. Examples of air data probes include pitot probes, pitot-static probes, and AOA probes. Air data probes are susceptible to failure caused by environmental conditions surrounding the air data probe and/or faulty or misfunctioning components within the probe head or the strut.

SUMMARY

A strut for an air data probe includes a socket at a first end of the strut, the socket including a side wall and an end wall connected to the sidewall. The strut further includes a first opening in the socket extending through the end wall of the socket and a second opening in the socket extending through the end wall of the socket and spaced from the first opening. The strut further includes a first pressure path formed within the strut and extending within the strut from the first opening in the socket to a second end of the strut and a second pressure path formed within the strut and extending within the strut from the second opening in the socket to the second end of the strut and spaced from the first pressure path. The strut is monolithic such that the socket, the first opening, the second opening, the first pressure path, and the second pressure path are integral to the strut.

An air data probe includes a probe head, a strut connected to the probe head, the strut including an angled groove extending into the strut, and an externally brazed heater positioned within the groove of the strut. A braze makes up a portion of the exterior surface of the strut.

An air data probe includes a probe head, a strut connected to the probe head, a pressure path extending through the strut, and a mounting flange connected to the strut. The strut and the mounting flange are monolithic. The air data probe further includes a thermal gap adjacent a second end of strut, the thermal gap being an air gap that extends through the strut between the mounting flange and the pressure path such that the thermal gap extends around the pressure path inward from the mounting flange.

DETAILED DESCRIPTION

In general, the present disclosure describes an additively manufactured one-piece strut for an air data probe that has (1) multiple pressure paths integrated with the strut and connected to a socket of the strut that has multiple ports, (2) a thermal gap adjacent a bottom portion of the strut and extending around bottom ends of the pressure paths, and (3) an external heater groove with protrusions to retain an externally inserted heater prior to being externally brazed. By combining multiple components into the monolithic strut, the strut requires less brazed pressure-tight joints and less components, simplifying assembly, increasing cost-effectiveness, and reducing the probability of failures.

Figure 1:
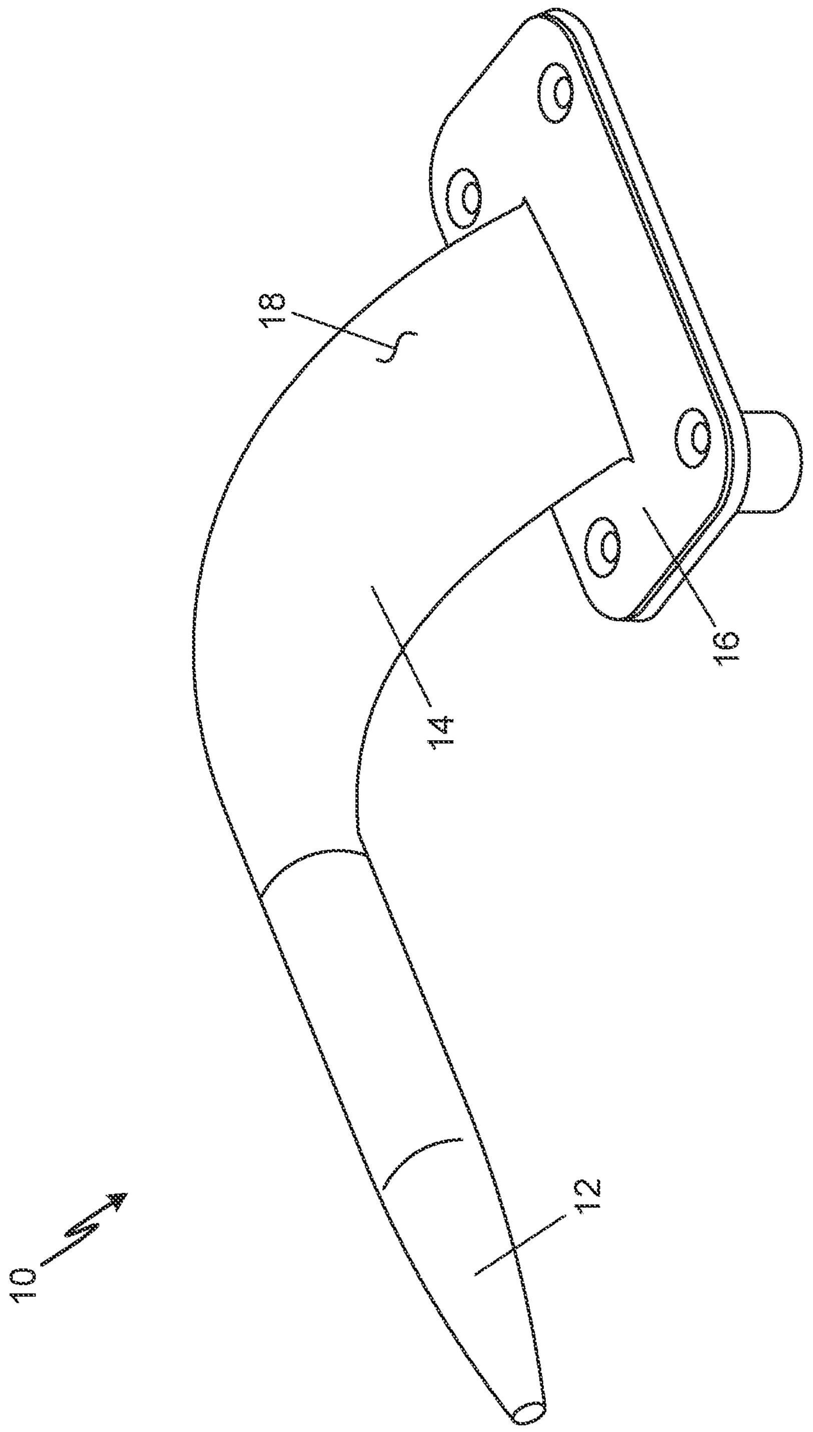
FIG. 1 is an isometric view of an air data probe from above the air data probe.

FIG. 1 is an isometric view of air data probe 10 from above air data probe 10. Air data probe 10 includes probe head 12, strut 14, mounting flange 16, and braze 18.

Air data probe 10 may be an AOA probe, a pitot probe, a pitot-static probe, or any other suitable air data probe. Probe head 12 is the sensing head of air data probe 10. Probe head 12 is a forward portion of air data probe 10. Probe head 12 has one or more ports positioned in probe head 12. Internal components of air data probe 10 are located within probe head 12. Probe head 12 is connected to an end of strut 14. Strut 14 is blade-shaped. Internal components of air data probe 10 are located within strut 14. Strut 14 is connected to, and unitary with, mounting flange 16. As such, strut 14 and mounting flange 16 are monolithic such that mounting flange 16 is part of single-piece strut 14. Mounting flange 16 makes up a mount of air data probe 10. Mounting flange 16 is connectable to an aircraft. Braze 18 is braze material that extends along strut 14 such that braze 18 makes up a portion of an external surface of strut 14. After brazing strut 14, braze 18 is machined down and strut 14 is recontoured to a final shape of strut 14, including braze 18, that is smooth.

Air data probe 10 is configured to be installed on an aircraft. Air data probe 10 may be mounted to a fuselage of the aircraft via mounting flange 16 and fasteners, such as screws or bolts. Strut 14 holds probe head 12 away from the fuselage of the aircraft to expose probe head 12 to external airflow. Probe head 12 takes in air from surrounding external airflow and communicates air pressures pneumatically through internal components and passages of probe head 12 and strut 14. Pressure measurements are communicated to a flight computer and can be used to generate air data parameters related to the aircraft flight condition.

Figure 2A:
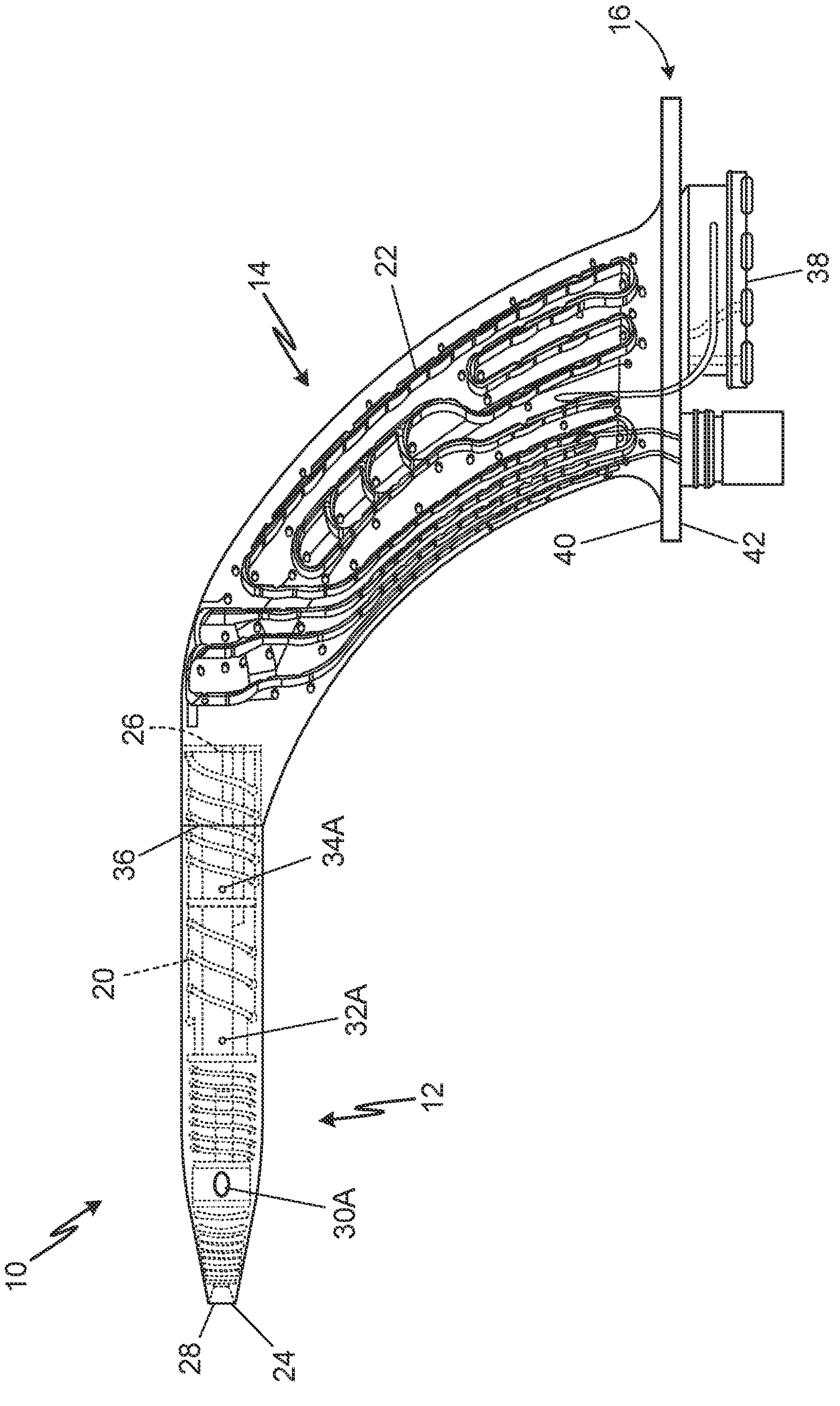
FIG. 2A is a side view of the air data probe prior to brazing a strut of the air data probe.
Figure 2B:
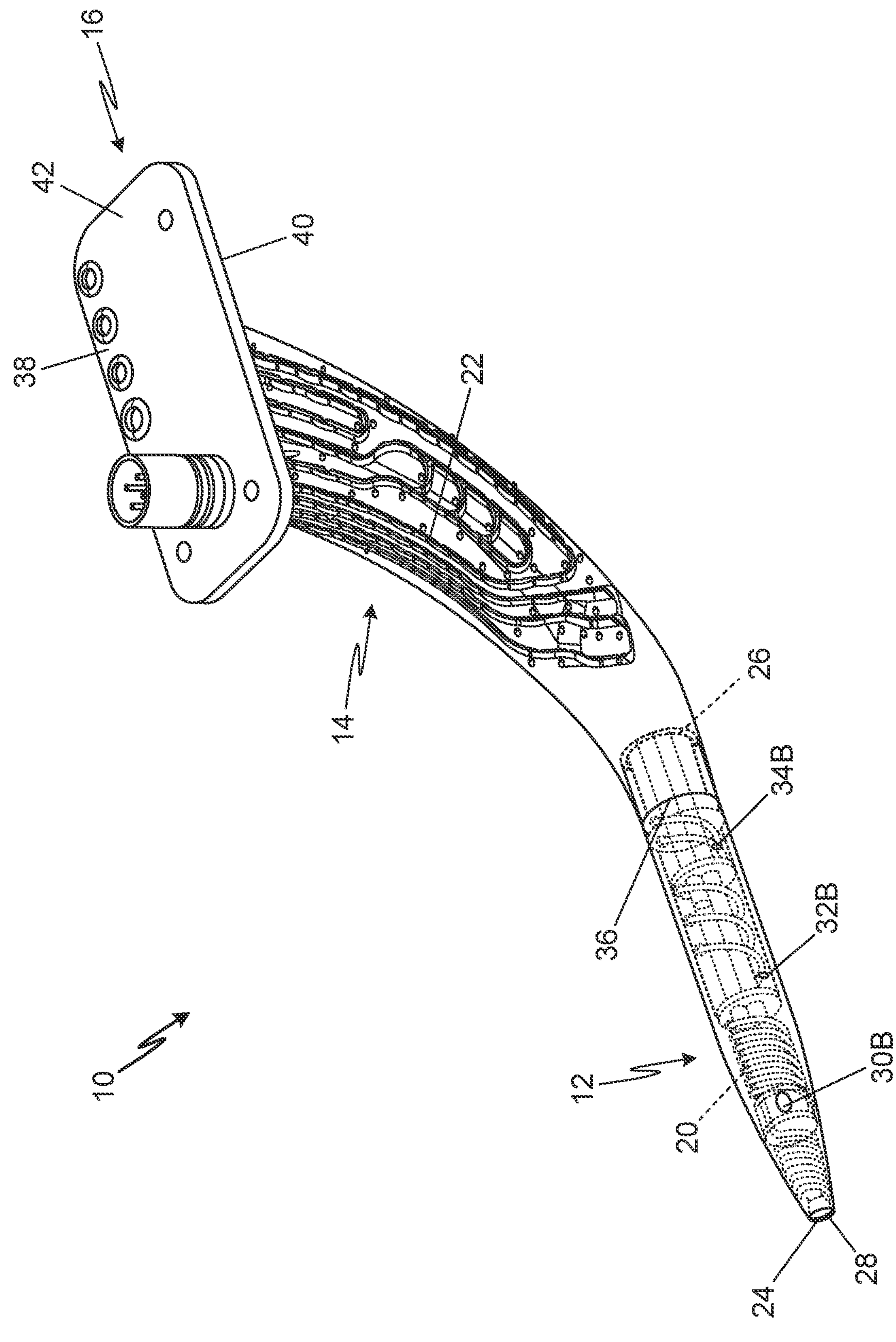
FIG. 2B is an isometric view of the air data probe from below the air data probe prior to brazing the strut of the air data probe.

FIG. 2A is a side view of air data probe 10 prior to brazing strut 14 of air data probe 10. FIG. 2B is an isometric view of air data probe 10 from below air data probe 10 prior to brazing strut 14 of air data probe 10. FIGS. 2A and 2B will be discussed together. Air data probe 10 includes probe head 12, strut 14, mounting flange 16, probe head heater 20, and strut heater 22. Probe head 12 includes first end 24, second end 26, pitot port 28, AOA ports 30 (including AOA port 30A (shown in FIG. 2A) and AOA port 30B (shown in FIG. 2B)), static ports 32 (including static port 32A (shown in FIG. 2A) and static port 32B (shown in FIG. 2B)), and drain ports 34 (including drain port 34A (shown in FIG. 2A) and drain port 34B (shown in FIG. 2B)). Strut 14 includes first end 36 and second end 38. Mounting flange 16 includes first end 40 and second end 42. In FIGS. 2A and 2B, probe head 12 is shown in transparent.

Probe head heater 20 is positioned within probe head 12. Probe head heater 20 is wire-like and is helically wound within probe head 20. Strut heater 22 is positioned within strut 14. Strut heater 22 is wire-like and is wound within strut 14. Strut heater 22 extends along a first side and a second side of strut 14.

Probe head 12 has first end 24 at one end, or an upstream end, and second end 26 at an opposite end, or a downstream end. First end 24 of probe head 12 makes up a tip of probe head 12. Second end 26 of probe head 12 is connected to strut 14. Pitot port 28 is an opening at first end 24 of probe head 12. Pitot port 28 extends through probe head 12 down a center portion of hollow probe head 12. Probe head 12 has two AOA ports 30. First AOA port 30A is an opening that extends through a first side of probe head 12, and second AOA port 30B is an opening that extends through a second side of probe head 12 opposite first AOA port 30A. Probe head 12 has two static ports 32. First static port 32A is an opening that extends through the first side of probe head 12 downstream from AOA port 30A. Second static port 32B is an opening that extends through the second side of probe head 12 downstream from AOA port 30B and opposite the first static port 32A. Probe head 12 has two drain ports 34. First drain port 34A is an opening that extends through the first side of probe head 12 downstream from static port 32A. Second drain port 34B is an opening that extends through the second side of probe head 12 downstream from static port 32B and opposite the first drain port 34A. In alternate embodiments, air data probe 10 may have any number and combination of pitot port 28, AOA ports 30, and static ports 32, and drain ports 34.

Strut 14 is an additively manufactured unitary, or one-piece, strut. Strut 14 has first end 36 at one end, or an upstream end, and second end 38 at an opposite end, or a downstream end. First end 36 of strut 14 is connected to second end 26 of probe head 12. Second end 38 of strut 14 is positioned beneath an exterior surface of the aircraft when air data probe 10 is installed on an aircraft. Strut heater 22 extends along the sides of strut 14 between first end 36 and second end 38 of strut 14. Mounting flange 16 is connected to strut 14 adjacent second end 38 of strut 14. Mounting flange 16 extends outward from strut 14. Mounting flange 16 and strut 14 are monolithic. Mounting flange 16 has first end 40 at a one end, or an upper end, and second end 42 at an opposite end, or a lower end. First end 40 of mounting flange 16 is exposed to external airflow when air data probe 10 is installed on an aircraft. Second end 42 of mounting flange 16 is connectable to an aircraft.

During assembly of air data probe 10, probe head heater 20 is positioned within probe head 12. Probe head heater 20 is connected to probe head 12, such as via brazing. Subsequently, probe head 12 with probe head heater 20 is connected to strut 14. Second end 26 of probe head 12 is inserted into first end 36 of strut 14. Probe head 12 is brazed to strut 14. Strut heater 22 is positioned within strut 14. Strut heater 22 is brazed to strut 14 externally such that braze 18 (shown in FIG. 1) builds up on an external surface of strut 14. Braze 18 is then machined down, and braze 18 and external surface of strut 14 are recontoured, resulting in strut 14 having a smooth exterior surface, as shown in FIG. 1. Thus, braze 18 makes up a portion of an exterior surface of strut 14 between first end 36 and mounting flange 16.

When air data probe 10 is installed on an aircraft, pitot port 28, AOA ports 30, and static ports 32, and drain port 34 communicate with external airflow. Air pressures are communicated pneumatically from pitot port 28, AOA ports 30, and static ports 32 through probe head 12 and strut 14 to an air data computer. Air data probe 10 is subjected to icing conditions during flight. Probe head heater 20 provides heat to probe head 12. Strut heater 22 provides heat to strut 14. Probe head 12 and strut 14 of air data probe 10 are heated to prevent ice accumulation on air data probe 10, which can interfere with the functionality of air data probe 10.

Figure 3A:
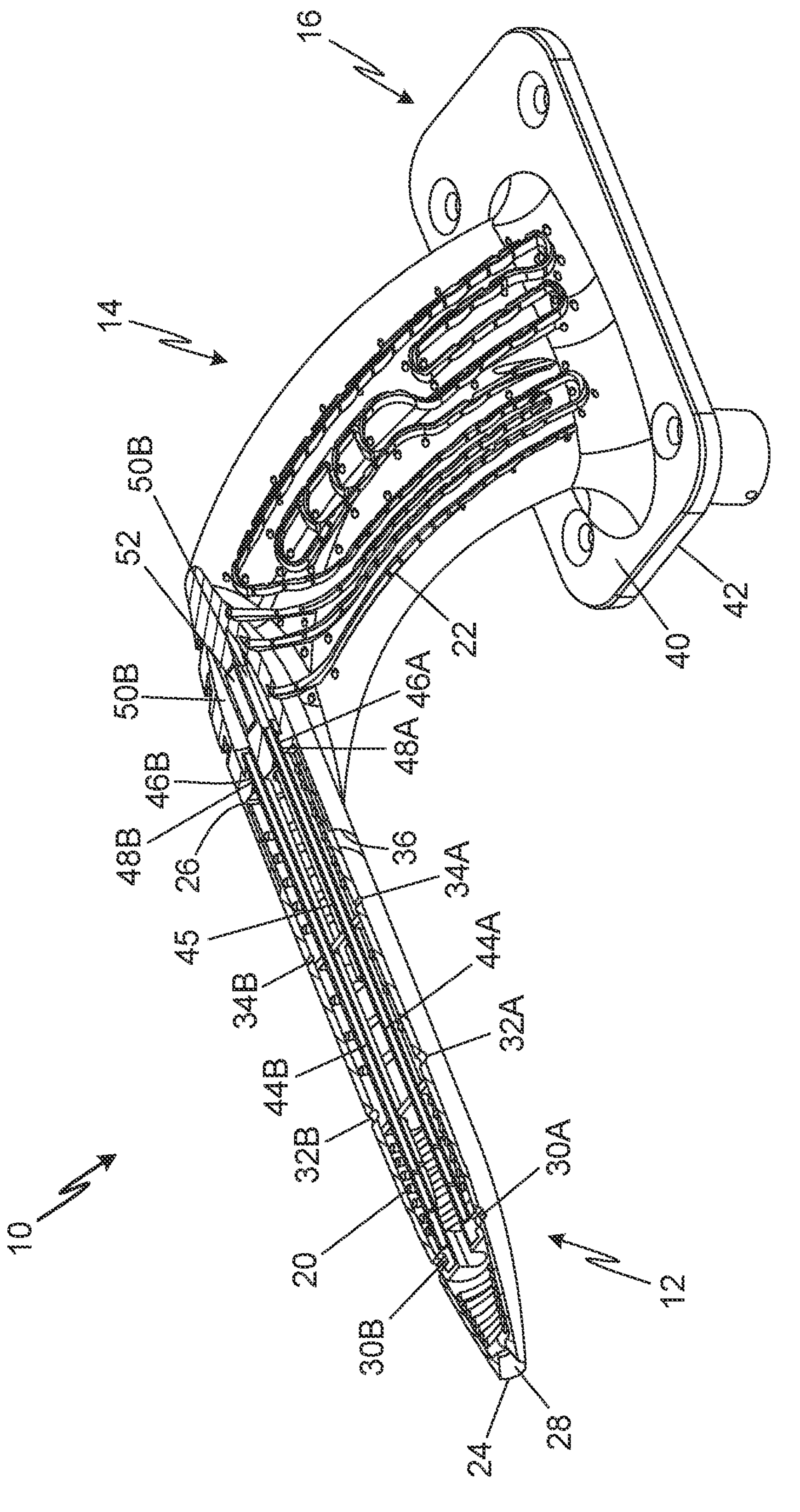
FIG. 3A is a cross-sectional view of the air data probe from above the air data probe prior to brazing the strut of the air data probe showing pressure joints of the air data probe.
Figure 3B:
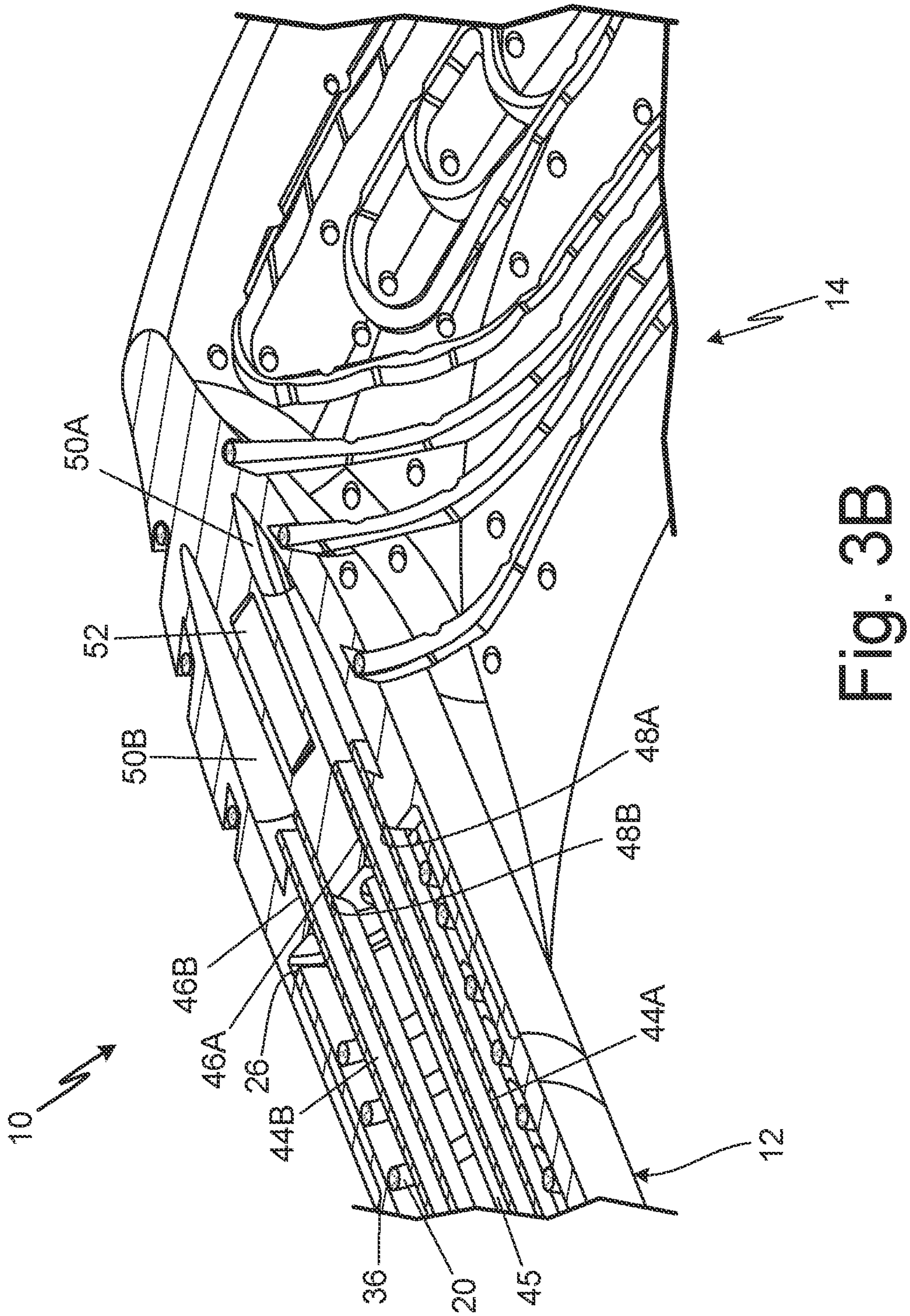
FIG. 3B is an enlarged partial cross-sectional view of the air data probe of FIG. 3A.

FIG. 3A is a cross-sectional view of air data probe 10 from above air data probe 10 prior to brazing strut 14 of air data probe 10 showing pressure joints 48 of air data probe 10. FIG. 3B is an enlarged partial cross-sectional view of air data probe 10. FIGS. 3A and 3B will be discussed together. Air data probe 10 includes probe head 12, strut 14, mounting flange 16 (shown in FIG. 3A), probe head heater 20, strut heater 22, AOA pressure passages 44 (including AOA pressure passage 44A and AOA pressure passage 44B), and joints 46 (including joint 46A and joint 46B). Probe head 12 includes first end 24 (shown in FIG. 3A), second end 26, pitot port 28 (shown in FIG. 3A), AOA ports 30 ((shown in FIG. 3A) including AOA port 30A and AOA port 30B), static ports 32 ((shown in FIG. 3A) including static port 32A and static port 32B), drain ports 34 ((shown in FIG. 3A) including drain port 34A and drain port 34B). Strut 14 includes first end 36, AOA openings 48 (including AOA opening 48A and AOA opening 48B), AOA pressure paths 50 (including AOA pressure path 50A and AOA pressure path 50B), and pitot pressure path 52. Mounting flange 16 (shown in FIG. 3A) includes first end 40 and second end 42.

AOA pressure passages 44 extend through probe head 12 within coiled probe head heater 22. AOA pressure passages 44 are tube-like. First ends of AOA pressure passages 44 are downstream from first end 24 of probe head. A first AOA pressure passage 44A is adjacent and in fluid communication with AOA port 30A. A second AOA pressure passage 44B is adjacent and in fluid communication with AOA port 30B. AOA pressure passage 44A is parallel to AOA pressure passage 44B. AOA pressure passages 44 are not in fluid communication with pitot port 28 or static ports 32. AOA pressure passages 44 extend past second end 26 of probe head 12 and into strut 14 at first end 36 of strut 14. As such, second ends of AOA pressure passages 44 are within strut 14.

AOA pressure passages 44 connect to strut 14 at AOA openings 48 to form joints 46. AOA pressure passage 44A forms joint 46A with AOA opening 48A of strut 14, and AOA pressure passage 44B forms joint 46B with AOA opening 48B of strut 14. AOA pressure passage 44A is fit into AOA opening 48A and brazed to AOA opening 48A to form joint 46A. AOA pressure passage 44B is fit into AOA opening 48B and brazed to AOA opening 48B to form joint 46A. Openings 48 are cylindrical to match the cylindrical shape of AOA pressure passages 44. Openings 48 have initial diameters that result in a suitable sized gap between openings 28 and AOA pressure passages 44 prior to brazing AOA pressure passages 44 to openings 48. Openings 48 have lengths that are long enough to provide enough surface area of strut 14 to braze to AOA pressure passages 44 but are short enough that an unnecessary amount of braze is not used and wasted in brazing pressure passages 44. As such, lengths of openings 48 allow a specific amount of braze to properly fill the gap between openings 48 and AOA pressure passages 44 during the brazing process. Brazed joints 46 are pressure-tight joints between AOA pressure passages 44 and AOA openings 48 of strut 14.

Second ends of AOA pressure passages 44 are downstream from AOA openings 48 and joints 46. Second ends of AOA pressure passages 44 are within AOA pressure paths 50. AOA pressure paths 50 are open spaces within strut 14 that extend to second end 38 of strut 14. A first AOA pressure path 50A has an upstream end adjacent a first side of strut 14, and a second AOA pressure path 50B has an upstream end adjacent a second side of strut 14. AOA pressure passage 44A is within, and in fluid communication with, AOA pressure path 50A. AOA pressure passage 44B is within, and in fluid communication with, AOA pressure path 50B. AOA pressure paths 50 are integral with strut 14.

Pitot pressure path 52 is an open space formed within strut 14 that extends within strut 14 to second end 38 of strut 14. Pitot pressure path 52 has an upstream end in strut 14 between upstream ends of AOA pressure paths 50. Pitot pressure path 52 is integral with strut 14. Pitot port 28 at first end 24 of probe head is in fluid communication with pitot pressure path 52. AOA pressure paths 50 and pitot pressure path 52 are spaced from each other.

AOA pressure passages 44 are pneumatically sealed to AOA openings 48 via joints 46 to communicate air pressures from AOA ports 30 along probe head 12, through AOA openings 48, respectively, to strut 14. Air pressures from AOA ports 30 are further communicated through strut 14 of air data probe 10 via AOA pressure paths 50. Air pressures from pitot port 28 are pneumatically communicated along probe head 12, and into strut 14 where the air pressures are communicated through strut via pitot pressure path 52. AOA pressure path 50 and pitot pressure path 52 allow for air-tight passage through strut 14 of air pressures from AOA ports 30 and pitot port 28 to an air data computer. As such, air data probe 10 can be used to accurately generate air data parameters.

Figure 4:
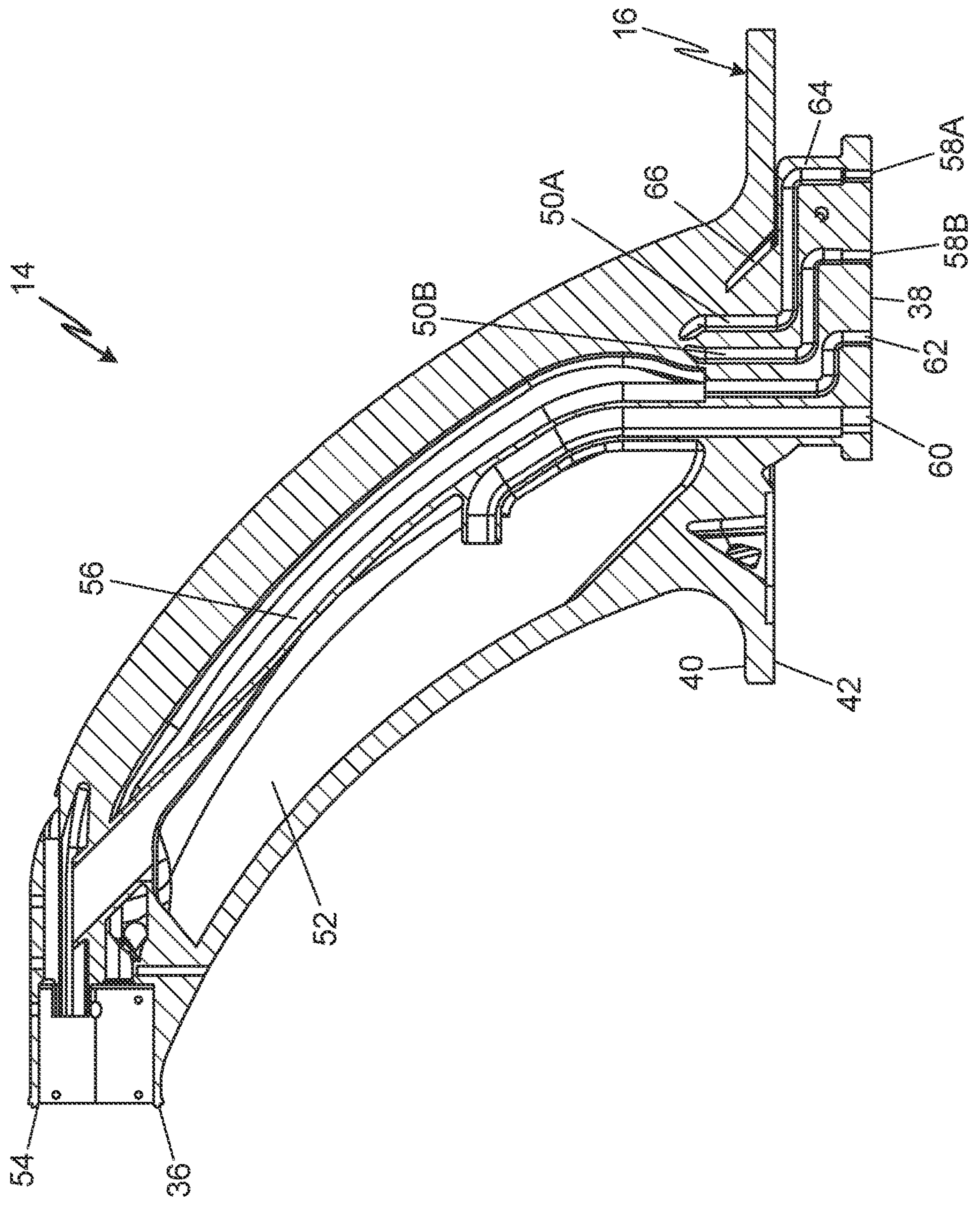
FIG. 4 is a cross-sectional side view of the strut of the air data probe showing pressure paths.
Figure 5A:
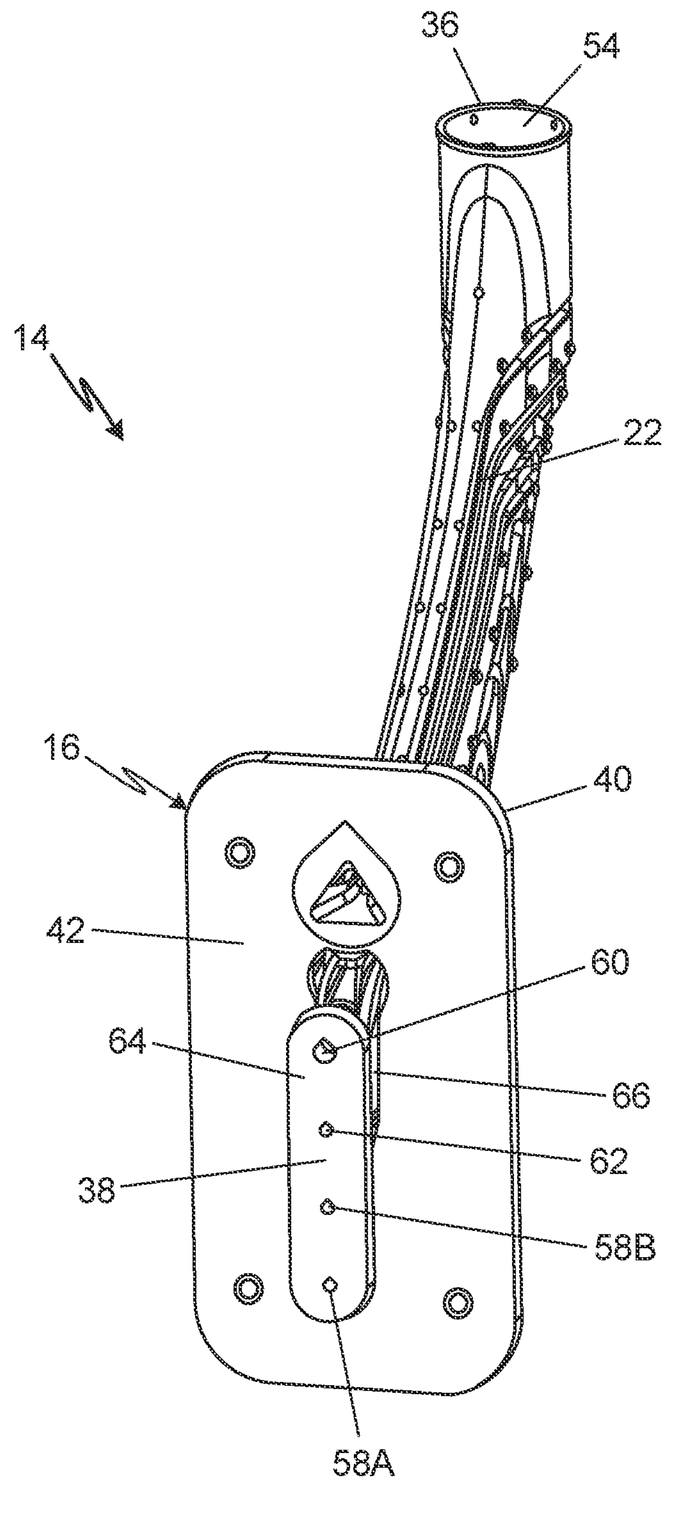
FIG. 5A is an isometric view of the strut of the air data probe from below the air data probe prior to brazing the strut showing a mounting flange and a thermal gap.
Figure 5B:
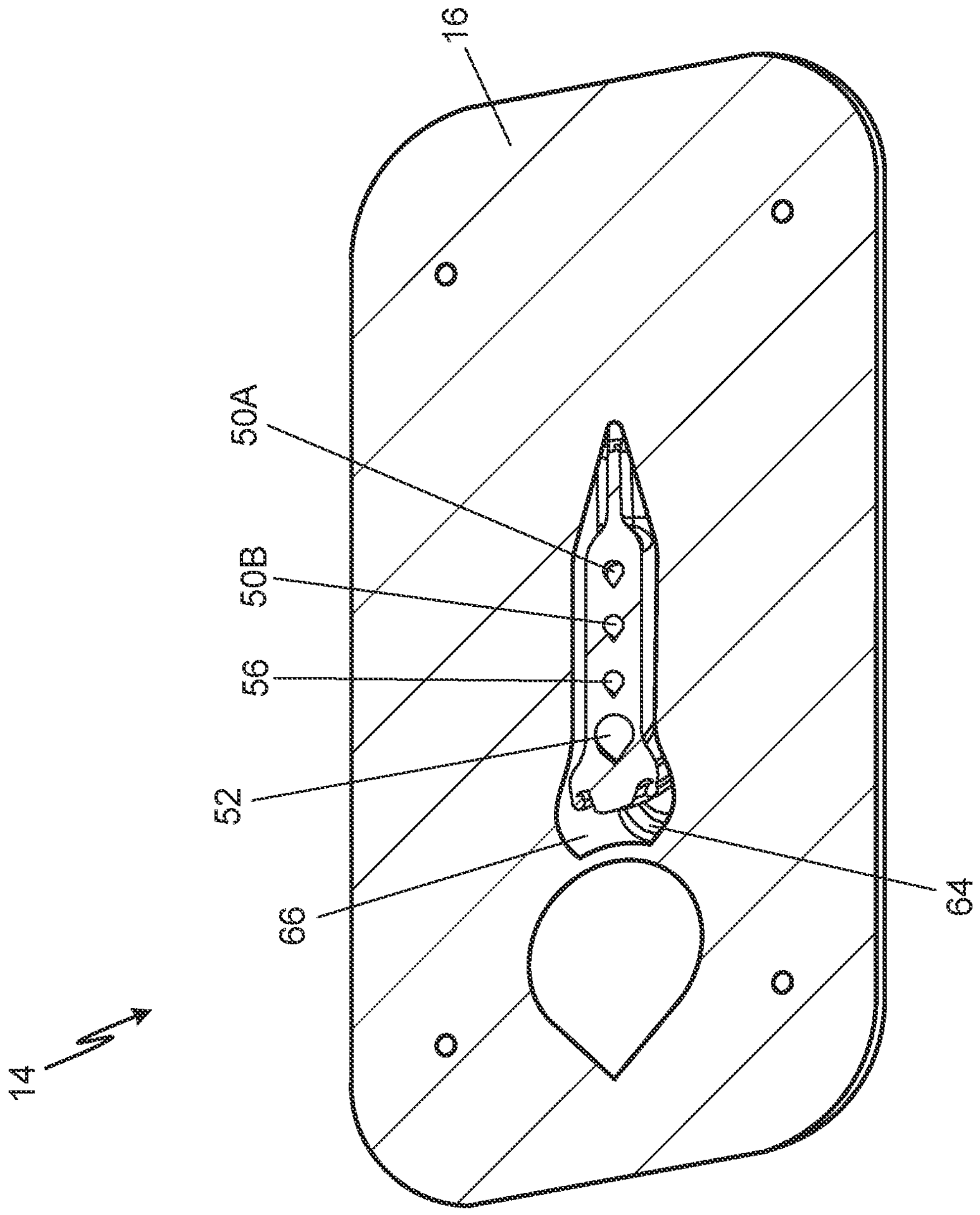
FIG. 5B is a cross-sectional isometric view of the strut from above the strut showing the mounting flange and the thermal gap.

FIG. 4 is a cross-sectional side view of strut 14 of air data probe 10 showing pressure paths 50 and 52. FIG. 5A is an isometric view of strut 12 of air data probe 10 from below air data probe 10 prior to brazing strut 14 showing mounting flange 16 and thermal gap 66. FIG. 5B is a cross-sectional isometric view of strut 14 from above strut 14 showing mounting flange 16 and thermal gap 66. FIGS. 4, 5A, and 5B will be discussed together. Air data probe 10 includes strut 14, mounting flange 16, and strut heater 22 (shown in FIG. 5A). Strut 14 includes first end 36 (shown in FIGS. 4 and 5A), second end 38 (shown in FIGS. 4 and 5A), AOA pressure paths 50 ((shown in FIGS. 4 and 5B) including AOA pressure path 50A and AOA pressure path 50B), pitot pressure path 52 (shown in FIGS. 4 and 5B), socket 54 (shown in FIGS. 4 and 5A), static pressure path 56 (shown in FIGS. 4 and 5B), AOA pressure outlets 58 ((shown in FIGS. 4 and 5A) including AOA pressure outlet 58A and AOA pressure outlet 58B), pitot pressure outlet 60 (shown in FIGS. 4 and 5A), static pressure outlet 62 (shown in FIGS. 4 and 5A), thermal isolation section 64, and thermal gap 66. Mounting flange 16 includes first end 40 (shown in FIGS. 4 and 5A) and second end 42 (shown in FIGS. 4 and 5A).

Socket 54 is at first end 36 of strut 14, extending from first end 36 of strut 14 to make up an upstream portion of strut 14. As such, first end 36 makes up an end of socket 54. Socket 54 is hollow and shaped to fit around second end 26 of probe head 12. AOA pressure paths 50 are spaces formed within strut 14 that extend through strut 14 downstream from socket 54 to second end 38 of strut 14. Pitot pressure path 52 is a space formed within strut that extends through strut 14 downstream from socket 54 to second end 38 of strut 14. Static pressure path 56 is a space formed within strut 14 that extends through strut 14 downstream from socket 54 to second end 38 of strut 14. Static pressure path 56 is in fluid communication with static ports 32. Strut 14 is monolithic such that socket 54, AOA pressure paths 50, pitot pressure path 52, and static pressure path 56 are integral with strut 14. Pitot pressure path 52, static pressure path 56, and AOA pressure paths 50 are spaced from each other within single-piece strut 14.

AOA pressure paths 50 extend through strut 14 to AOA pressure outlets 58 at second end 38 of strut 14. AOA pressure path 50A extends through strut 14 to AOA pressure outlet 58A. AOA pressure path 50B extends through strut 14 to AOA pressure outlet 58B. Pitot pressure path 52 extends through strut 14 to pitot pressure outlet 60. Static pressure path 56 extends through strut 14 to static pressure outlet 62. AOA pressure outlets 58, pitot pressure outlet 60, and static pressure outlet 62 are aligned and positioned within thermal isolation section 64. Thermal isolation section 64 extends from below second end 42 of mounting flange 16 to second end 36 of strut 14. When air data probe 10 is mounted to an aircraft, thermal isolation section 64 is configured to be below the skin of an aircraft.

Thermal gap 66 is an air gap, or space, that extends through strut 14 around a portion of strut connected to and above thermal isolation section 64. As such, thermal gap 66 extends through strut 14 from second end 42 of mounting flange to first end 40 of mounting flange 16. In this embodiment, thermal gap 66 extends beyond first end 40 of mounting flange. Thus, thermal gap 66 extends around strut 14 within mounting flange 16, or is interior to mounting flange 16. As a result, thermal isolation section 64 is not connected to mounting flange 16. Thermal gap 66 extends around, or surrounds, AOA pressure paths 50, pitot pressure path 52, and static pressure path 56 adjacent AOA pressure outlets 58, pitot pressure outlet 60, and static pressure outlet 62 in thermal isolation section 64. As such, thermal gap 66 is between mounting flange 16 and AOA pressure paths 50, pitot pressure path 52, and static pressure path 56.

Air pressures from AOA ports 30 are pneumatically communicated through strut 14 via AOA pressure paths 50 and exit strut 14 at AOA pressure outlets 58. Air pressures from pitot port 28 are pneumatically communicated through strut 14 via pitot pressure path 52 and exit strut 14 at pitot pressure outlet 60. Air pressures from static ports 32 are pneumatically communicated through strut 14 via static pressure path 56 and exit strut 14 at static pressure outlet 62. AOA pressure paths 50, pitot pressure path 52, and static pressure path 56 are individual pressure paths integrated into strut 14 to direct different air pressures through strut 14 at the same time. AOA pressure path 50, pitot pressure path 52, and static pressure path 56 allow for air-tight passage through strut 14 of air pressures from AOA ports 30, pitot port 28, and static ports 32 to a flight computer to accurately generate multiple air data parameters.

Thermal isolation section 64 and thermal gap 66 provide thermal isolation for airflow traveling to and exiting AOA pressure outlets 58, pitot pressure out 60, and static pressure outlet 62. Thermal gap 66 is a space that extends all the way around AOA pressure path 50, pitot pressure path 52, and static pressure path 56 adjacent mounting plate 16 to create an air gap between mounting flange 16 and AOA pressure path 50, pitot pressure path 52, and static pressure path 56. As such, thermal isolation section 64 and thermal gap 66 thermally isolate downstream ends of AOA pressure path 50, pitot pressure path 52, and static pressure path 56 and AOA pressure outlets 58, pitot pressure out 60, and static pressure outlet 62 from cold mounting flange 16. Four different isolated air pressures are also thermally isolated as they reach mounting flange 16 and enter an aircraft so that they can reach a computer within the aircraft and provide accurate measurement.

Traditional air data probes that gather multiple pressures require individual pressure paths, each with dedicated components, to communicate the multiple pressures from the probe head through the strut. The components of each individual pressure path must be brazed, or otherwise connected, to result in air-tight, sealed joints, as the paths must be pressure-tight for the air data probe to generate accurate measurements. Assembling the individual pressure paths and forming numerous pressure-tight joints can be time-consuming and result in more failure points within the air data probe. The strut also requires an access opening in the strut to access such components for assembly. As a result, the strut includes a cap to seal the access opening, which further increases the part-count, increases assembly time, and introduces another failure point, as the cap requires a pressure-tight seal.

Because air data probe 10 has a single-piece strut 10 with integrated AOA pressure paths 50, pitot pressure path 52, and static pressure path 56, different isolated pressure paths are unitary with strut 14. Strut 14 is monolithic, combining traditionally separate parts into a single piece. Air data probe 10 is easier and faster to assemble as pressure paths are already present in strut 14 and less parts are required. Requiring less joints that need to come together and be pressure tight makes air data probe 10 have a lower risk of failure.

When air data probe 10 is mounted to an aircraft, mounting flange 16 is exposed to cold temperatures exterior to the aircraft. As such, mounting flange 16 is cold. By creating separation from mounting flange 16, thermal isolation section 64 and thermal gap 66 help keep the ends of AOA pressure paths 50, pitot pressure path 52, and static pressure path 56 and AOA pressure outlets 58, pitot pressure outlet 60, and static pressure outlet 62 above freezing. As such, if any of AOA pressure paths 50, pitot pressure path 52, and static pressure path 56 contain moisture, it will not turn to ice and interfere with the accuracy of the measurements from air data probe 10.

Figure 6A:
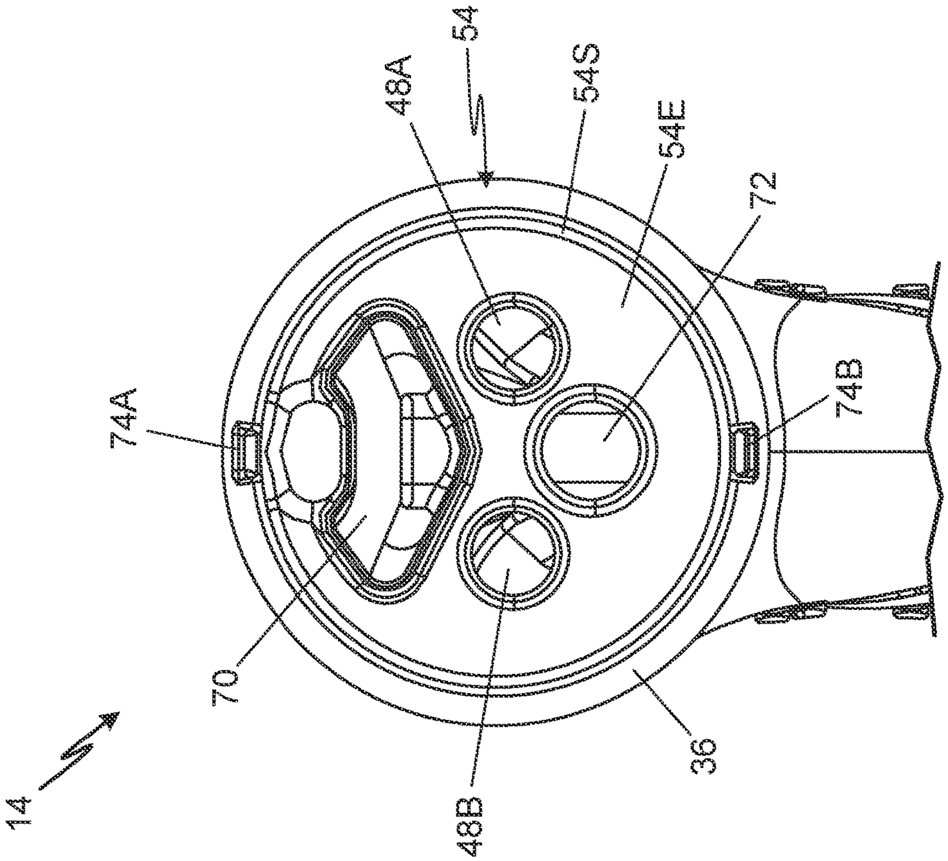
FIG. 6A is an enlarged partial front view of the strut of the air data probe prior to brazing the strut showing a socket of the strut prior to inserting a probe head of the air data probe.
Figure 6B:
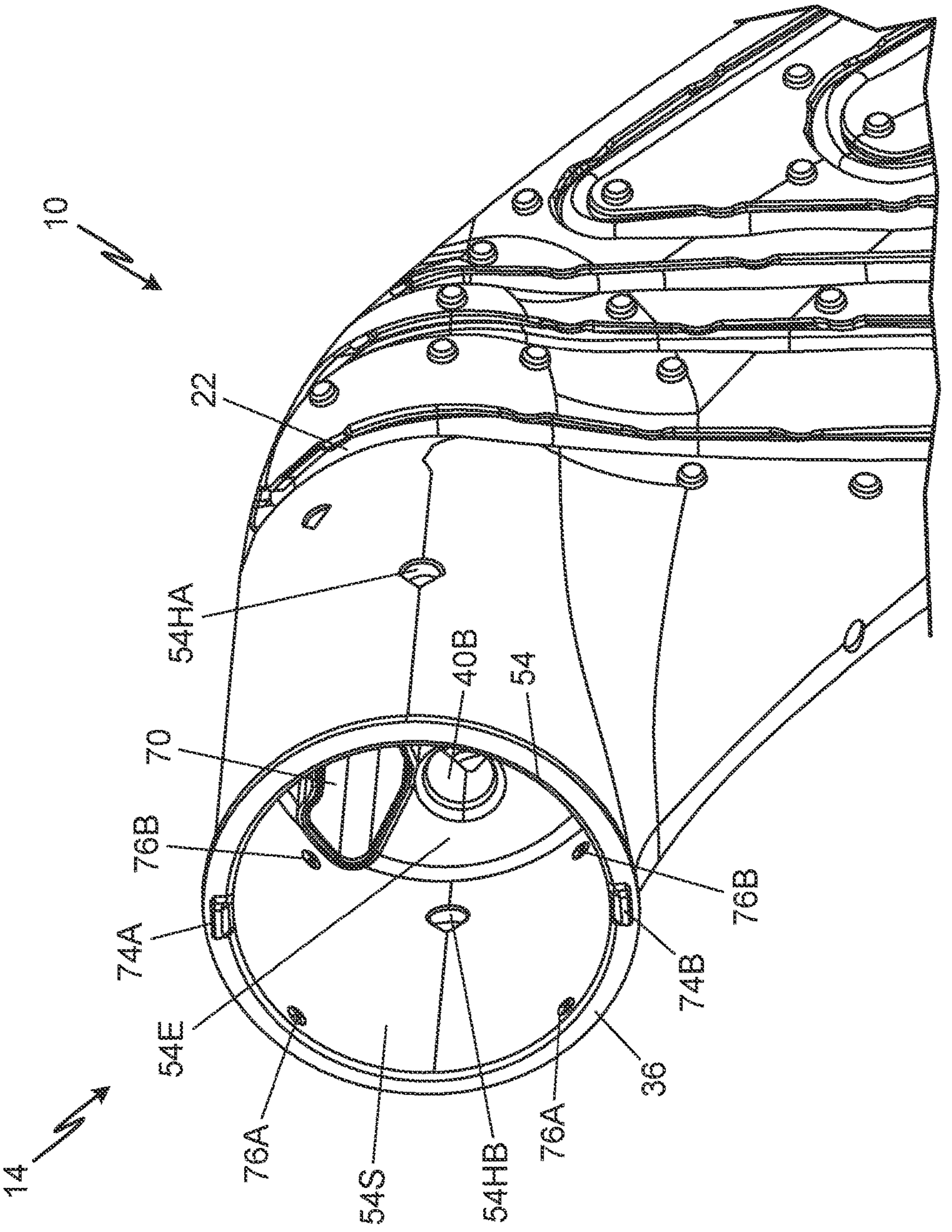
FIG. 6B is an enlarged partial isometric view of the strut of the air data probe prior to brazing the strut showing the socket of the strut prior to inserting the probe head of the air data probe.

FIG. 6A is an enlarged partial front view of strut 14 of air data probe 10 prior to brazing strut 14 showing socket 54 of strut 14 prior to inserting probe head 12 of air data probe 10. FIG. 6B is an enlarged partial isometric view of strut 14 of air data probe 10 prior to brazing strut 14 showing socket 54 of strut 14 prior to inserting probe head 12 of air data probe 10. FIGS. 6A and 6B will be discussed together. Air data probe 10 includes strut 14, strut heater 22 (FIG. 6B). Strut 14 includes first end 36, AOA openings 48 (including AOA opening 48A (shown in FIG. 6A) and AOA opening 48B), socket 54 (including sidewall 54S, end wall 54E, and holes 54H ((shown in FIG. 6B) including hole 54HA and hole 54HB)), pitot opening 70, static opening 72 (shown in FIG. 6A), tabs 74 (including tab 74A and tab 74B), and bumps 76 ((shown in FIG. 6B) including bumps 76A and bumps 76B).

Socket 54 has sidewall 54S extending from first end 36 of strut 14 to end wall 54E of socket 54. Socket 54 is hollow and is open at a first end of socket 54 at first end 36 of strut. End wall 54E is connected to sidewall 54S and makes up a second end of socket 54. Socket 54 has two holes 54H. First hole 54HA extends through sidewall 54S at a first side of socket 54, and second hole 54HB extends through sidewall 54S at a second side of socket 54.

Pitot opening 70 is an opening that extends through end wall 54E of socket 54 adjacent a top of socket 54. Pitot pressure path 52 extends within strut 14 from pitot opening 70 to pitot pressure outlet 60 at second end 38 of strut 14. Static opening 72 is an opening that extends through end wall 54E of socket 54 adjacent a bottom of socket 54. Static pressure path 56 extends within strut 14 from static opening 72 to static pressure outlet 62. AOA opening 48A is an opening that extends through end wall 54E of socket 54 adjacent a first side of socket 54. AOA pressure path 50A extends within strut from AOA opening 48A to AOA pressure outlet 58A. AOA opening 48B is an opening that extends through end wall 54E of socket 54 adjacent a second side of socket 54. AOA pressure path 50B extends within strut from AOA opening 48B to AOA pressure outlet 58B. AOA pressure passages 44 are positioned within AOA openings 48, as discussed with respect to FIGS. 3A and 3B. Pitot opening 70, static opening 72, and AOA openings 48A are spaced from each other. Strut 14 is monolithic such that socket 54, pitot opening 70, static opening 72, and AOA openings 48A are integral with strut 14.

Prior to inserting probe head 12 into socket 54 of strut 14 and brazing probe head 12 to strut 14, strut 14 includes tabs 74 and bumps 76. Tabs 74 extend out from first end 36 of strut 14 and first end of socket 54. Tab 74A is a protrusion that extends forward from a top of an end of sidewall 54S of socket 54. Tab 74B is a protrusion that extends forward from a bottom of an end of sidewall 54S of socket 54. Tabs 74 are integral to strut 14. As seen in FIG. 6B, bumps 76 are small protrusions that extend inward from an inner surface of sidewall 54S of socket 54. Strut 14 includes two rows of four spaced bumps 76 each. Four bumps 76 are equally spaced from each other in a first row. Four bumps 76 are equally spaced from each other in a second row.

Pitot opening 70 is the opening to pitot pressure path 54 (shown in FIGS. 3A-5B). Static opening 72 is the opening to static pressure path 56 (shown in FIGS. 3A-5B). AOA opening 48A is the opening to AOA pressure path 50A (shown in FIGS. 3A-5B). AOA opening 48B is the opening to AOA pressure path 50B (shown in FIGS. 3A-5B). AOA pressure passages 44 are positioned within AOA openings 44. During assembly of air data probe 10, probe head 12 is inserted into strut 14. Bumps 76 contact probe head 12 during insertion. Probe head 12 scrapes bumps 76 when probe head 12 is being inserted into socket 54 and deforms bumps. As such, bumps 76 center probe head 12 within socket 54 of strut 14 during insertion of probe head 12 into socket 54. Bumps 76 also retain probe head 12 within socket of strut 14 via an interference fit between bumps 76 and probe head 12 once probe head 12 is fully inserted into socket 54. Each row of bumps 76 further centers and retains probe head 12. When probe head 12 is fully inserted into strut 14, tabs 74 contact a shoulder of probe head 12. When probe head 12 engages tabs 74, second end 26 of probe head is properly positioned within socket 54. Probe head 12 is then brazed and sealed to strut 14. Holes 54H provide an opening for visual assessment of whether the braze traveled all the way through the joint.

When probe head 12 is connected and sealed to strut 14, pitot opening is in air-tight fluid communication with pitot port 28, static opening 72 is in air-tight fluid communication with static ports 52 and 54, and AOA openings 48 are in air-tight fluid communication with AOA ports 30, respectively. Airflow from pitot port 28 that has traveled through a top of probe head 12 enters pitot opening 70 and travels through pitot pressure path 52. Airflow from static ports 52 and 54 travels through probe head 12, enters static opening 72, and travels through static pressure path 56. Airflow from AOA port 30A travels through pitot probe 12, enters AOA opening 48A and travels through AOA pressure path 50A. Airflow from AOA port 30B travels through pitot probe 12, enters AOA opening 48B and travels through AOA pressure path 50B.

Because socket 54 has pitot opening 70, static opening 72, and AOA openings 48A four separate integrated pressure paths (pitot pressure path 54 static pressure path 56, and AOA pressure path 50B) can be connected to probe head 12 when probe head 12 is inserted into socket 54. By centering probe head 12 during insertion via bumps 76 of socket 54, pitot opening 70, static opening 72, and AOA openings 48A are properly aligned with airflow from pitot port 28, static ports 32, and AOA ports 30, respectively. Retaining probe head 12 via bumps 76 ensures probe head 12 is not loose, does not move to one side prior to brazing, and does not get pulled to one side when heated up during brazing. As such, probe head 12 is centered and retained via bumps 76 so that probe head 12 stays in position while probe head 12 is being brazed to strut 14.

Tabs 74 set a consistent, uniform gap between probe head 12 and socket 54 of strut 14 when probe head 12 is fully inserted into socket 54 such that the distance between the second end 26 of probe head 12 and end wall 54E of socket 54 is a set suitable distance and the distance between first end 36 of strut 14 to probe head 12 is set suitable distance. As such, a suitable sized gap between probe head 12 and strut 14 is consistently present to allow braze to flow properly between probe head 12 and socket 54 of strut 14. As a result, after brazing probe head 12 to strut 14, a joint is formed all the way around probe head 12 and strut 14. Visually seeing braze through holes 54H ensures that probe head 12 is properly sealed to strut 14.

Figure 7A:
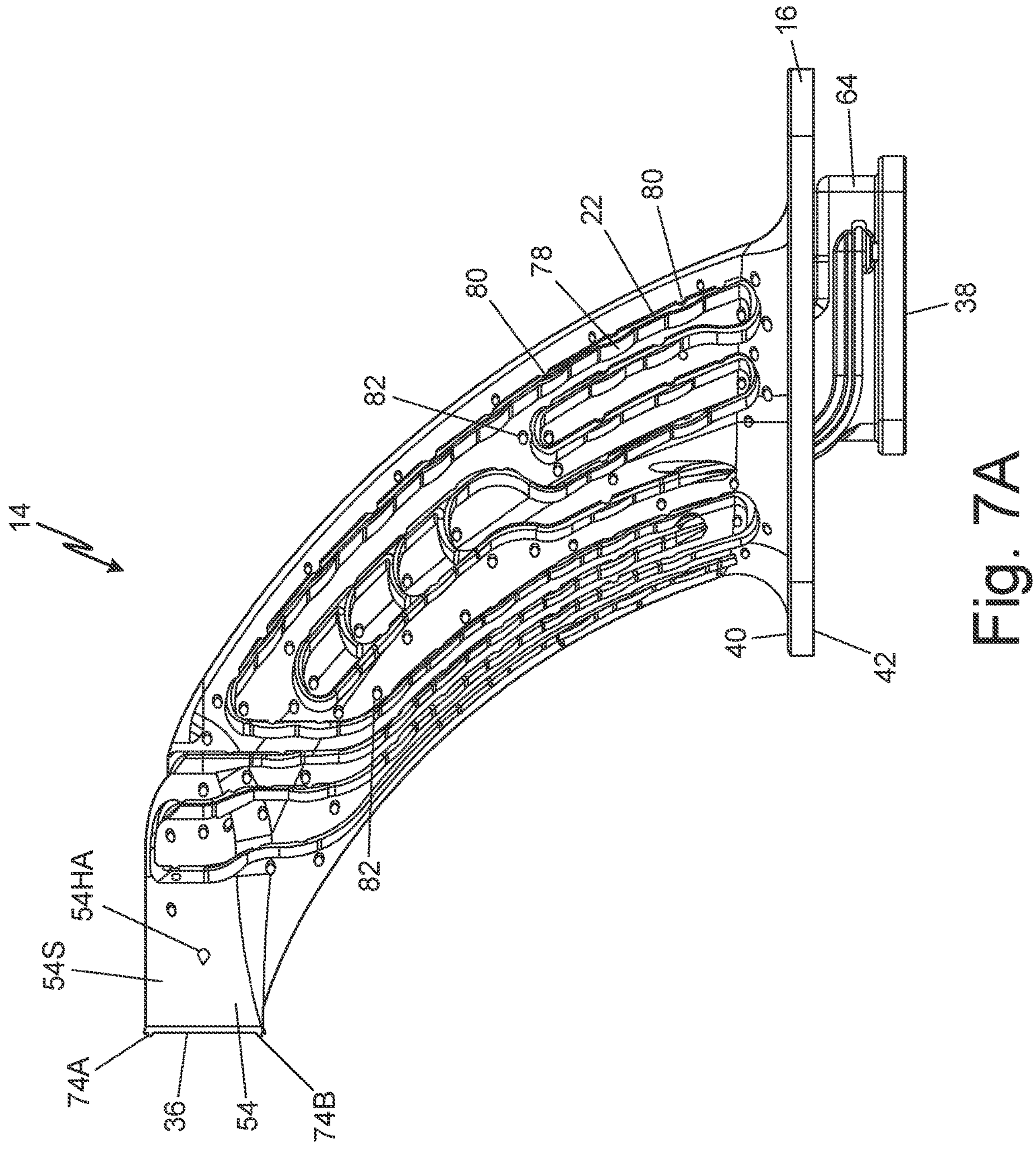
FIG. 7A is a side view of the strut of the air data probe prior to brazing the strut showing a groove of the air data probe with a strut heater inserted into the groove.
Figure 7B:
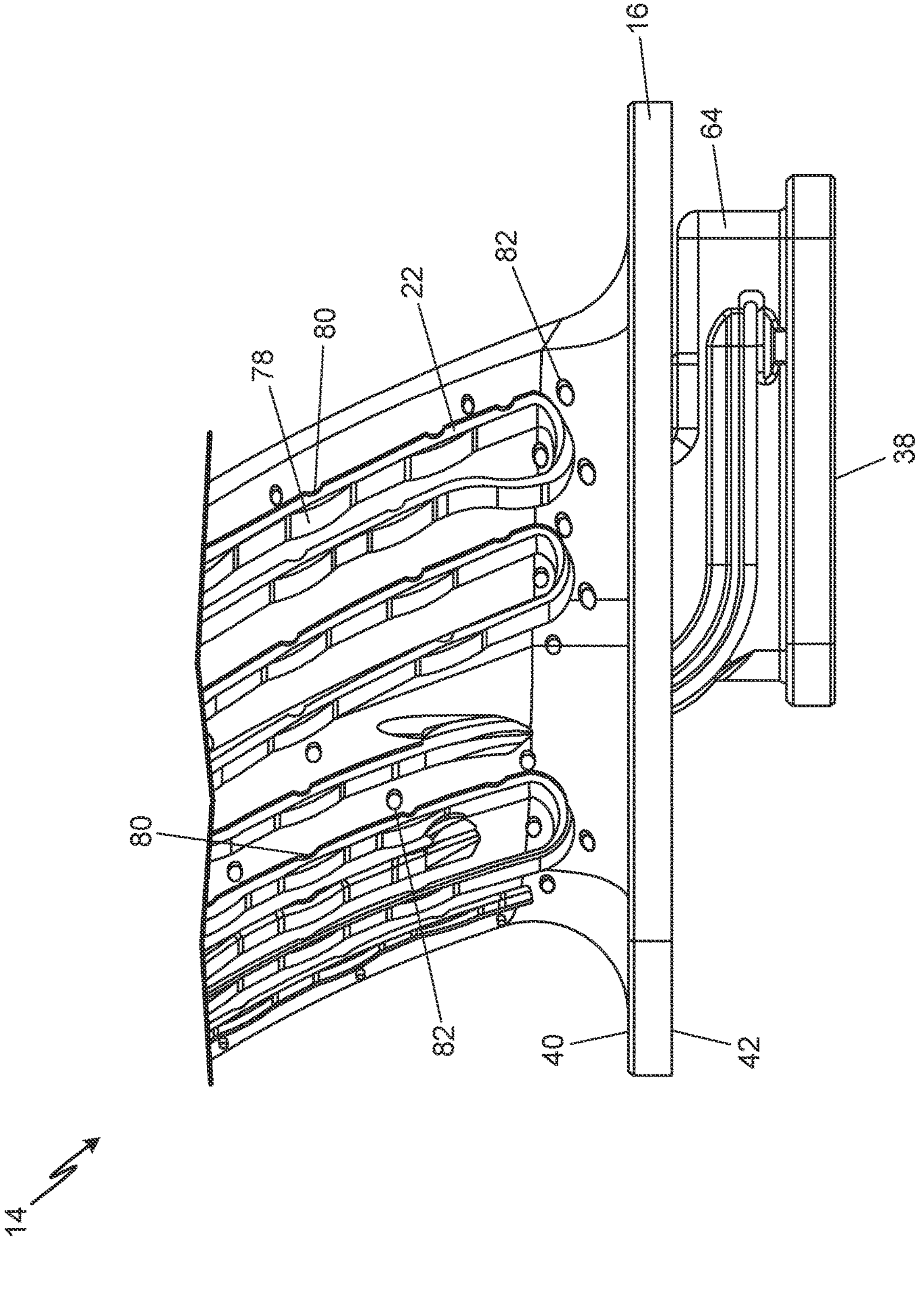
FIG. 7B is an enlarged partial side view of the strut of the air data probe prior to brazing the strut with the strut heater inserted into the groove showing retaining portions of the groove.
Figure 7C:
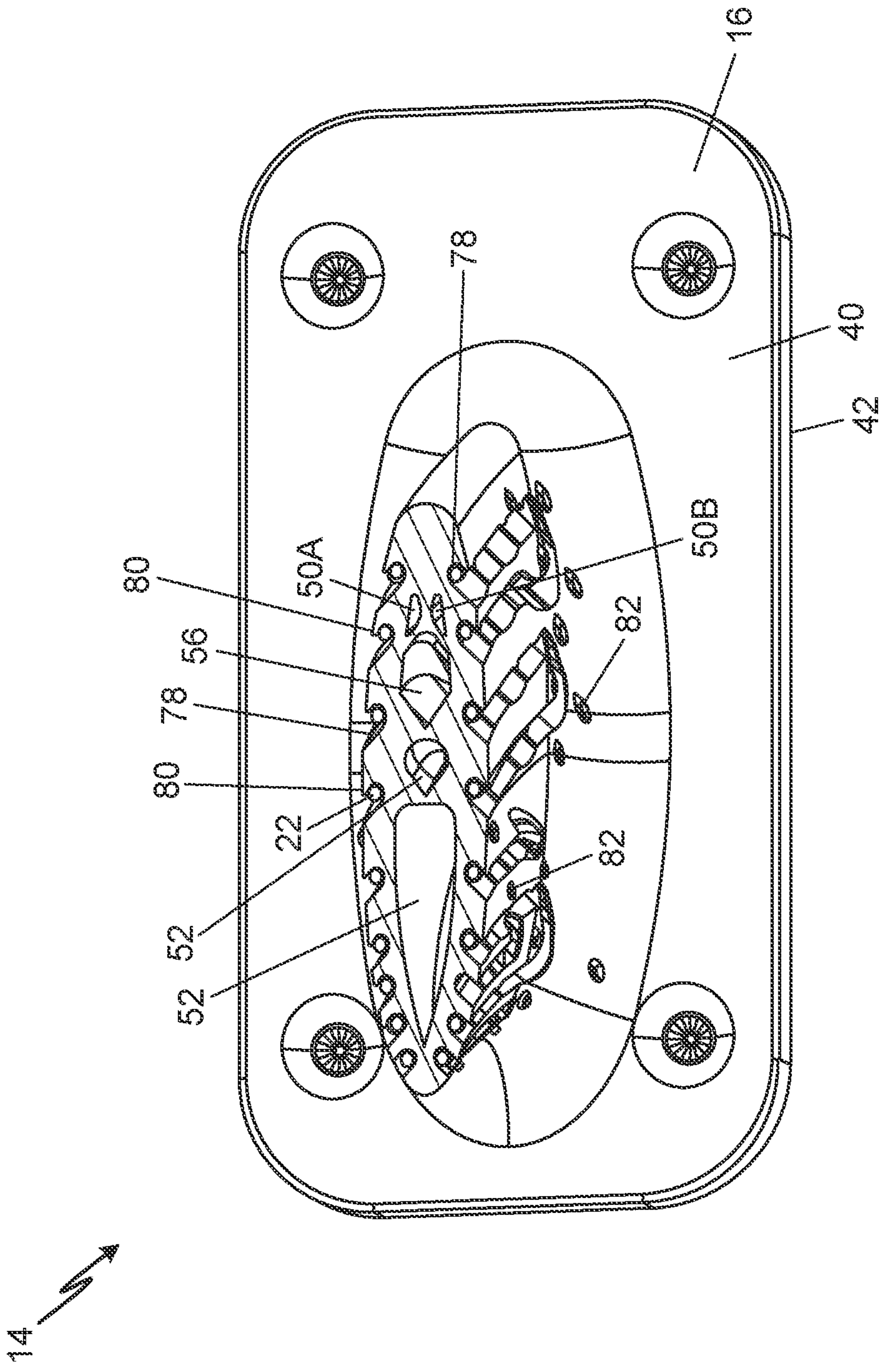
FIG. 7C is a cross-sectional view of the strut of the air data probe prior to brazing the strut with the strut heater inserted into the groove showing retaining portions of the groove.

FIG. 7A is a side view of strut 14 of air data probe 10 prior to brazing strut 14 showing groove 78 of air data probe 10 with strut heater 22 inserted into groove 78. FIG. 7B is an enlarged partial side view of strut 14 of air data probe 10 prior to brazing strut 14 with strut heater 22 inserted into groove 78 showing retaining portions 80 of groove 78. FIG. 7C is a cross-sectional view of strut 14 of air data probe 10 prior to brazing strut 14 with strut heater 22 inserted into groove 78 showing retaining portions 80 of groove 78. FIGS. 7A and 7B will be discussed together. Air data probe 10 includes strut 14, mounting flange 16, and strut heater 22. Strut 14 includes first end 36 (shown in FIG. 7A), second end 38 (shown in FIGS. 7A and 7B), AOA pressure paths 50 ((shown in FIG. 7C) including AOA pressure path 50A and AOA pressure path 50B), pitot pressure path 52 (shown in FIG. 7C), socket 54 ((shown in FIG. 7A) including sidewall 54S and hole 54HA), static pressure path 56 (shown in FIG. 7C), thermal isolation section 64 (shown in FIGS. 7A and 7B), tabs 74 ((shown in FIG. 7A) including tab 74A and tab 74B), groove 78, retaining portions 80, protrusions 82. Mounting flange 16 includes first end 40 and second end 42 (shown in FIGS. 7A and 7B).

Strut heater 22 is positioned within groove 78. Groove 78 extends into a first side and a second side of strut 14 from an exterior surface of strut 14 prior to brazing strut heater 22 to strut 14. Groove 78 is angled from a bottom portion of groove 78 to a top portion of groove 78. Groove 78 is angled such that a portion of groove 78 overhangs strut heater 22 positioned within groove 78 prior to brazing strut heater 22 to strut 14. Retaining portions 80 are spaced protrusions that partially extend over groove 78 at a top portion of groove 78 prior to brazing strut heater 22 to strut 14. Protrusions 82 extend outward from an exterior surface of strut 14 prior to brazing strut heater 22 to strut 14. In this embodiment, protrusions 82 are cylindrical. In alternate embodiments, protrusions 82 may be any suitable shape.

During assembly of air data probe 10, strut heater 22 is pushed into groove 78. Because groove is angled, the top portion of groove 78 that overhangs strut heater 22 helps retain strut heater 22 in groove. Retaining portions 80 create a snap-like fit for strut heater 22 within groove 78 as strut heater 22 is further retained within groove 78 by retaining portions 80. Retaining portions 80 partially extend over groove 78 so that heater 22 may contact retaining portions 80 instead of moving out of groove 78. Once strut heater 22 is positioned within groove 78, strut heater 22 is brazed into strut 14, braze 18 (seen in FIG. 1) filling gaps between strut 14 and strut heater 22 and building up on strut 14. After brazing, strut heater 22 is locked into groove 78 of strut 14. Strut 14 is then recontoured and braze 18 is ground down until braze 18 forms a portion of an exterior surface of strut 14 and the exterior surface of strut 14 is smooth.

Protrusions 82 act as recontouring aids for strut 14. After strut heater 22 is brazed into strut 14, the build up of braze 18 on strut 14 requires removal. As such, strut 14 is recontoured down to a smooth exterior surface. During the recontouring process, protrusions 82 provide a visual contrast between strut 14 and braze material 18. Protrusions 82 become visible as dots when grinding strut 14 during the recontouring process. Protrusions 82 are a visual aid that indicate the distance from the original exterior surface of strut 14, so that the griding process can be adjusted accordingly. Protrusions 82 will be fully ground away if the strut is perfectly ground down, or recontoured. A portion of one or more protrusions 82 may also remain on strut 14 after air data probe 10 has undergone complete assembly.

Traditional air data probes have struts with internally laced heaters, which requires an access opening in the strut. The heater is internally positioned within the strut and then brazed internally, which can be difficult. As a result, the strut includes a cap to seal the access opening, which requires a pressure-tight seal. During the internal brazing process, the internal heater may crack due to stress from aligning the heater and the strut.

By attaching strut heater 22 externally, strut heater 22 can be embedded within strut 14 and be well supported. As a result, strut heater 22 will not crack during the external brazing process, which is quicker and easier than internal brazing. As strut 14 does not require a cap, strut 14 does not have a cap joint that needs to be brazed, resulting in less potential failure points and further casing assembly. Angle groove 78 and retaining portions 80 are built-in retention features that keep strut heater 22 in place during brazing so that additional material is not required to keep strut heater 22 in place during brazing. Protrusions 82 provide a visual contrast during recontouring to prevent over-griding strut 14 and contacting, and potentially damaging, strut heater 22.

Discussion of Possible Embodiments

The following are non-exclusive descriptions of possible embodiments of the present invention.

A strut for an air data probe includes a socket at a first end of the strut, the socket comprising: a side wall; and an end wall connected to the sidewall; a first opening in the socket extending through the end wall of the socket; a second opening in the socket extending through the end wall of the socket and spaced from the first opening; a first pressure path formed within the strut and extending within the strut from the first opening in the socket to a second end of the strut; and a second pressure path formed within the strut and extending within the strut from the second opening in the socket to the second end of the strut and spaced from the first pressure path; wherein the strut is monolithic such that the socket, the first opening, the second opening, the first pressure path, and the second pressure path are integral to the strut.

The strut of the preceding paragraph can optionally include, additionally and/or alternatively, any one or more of the following features, configurations and/or additional components:

The first opening is a pitot opening and the first pressure path is a pitot pressure path.

The second opening is a static opening and the second pressure path is a static pressure path.

A third opening in the socket extending through the end wall of the socket and spaced from the first opening and the second opening, the third opening being a first AOA opening; a fourth opening in the socket extending through the end wall of the socket and spaced from the first opening, the second opening, and the third opening and being a second AOA opening; a third pressure path formed within the strut and extending within the strut from the third opening in the socket to the second end of the strut, the third pressure path being a first AOA pressure path; and a fourth pressure path formed within the strut and extending within the strut from the fourth opening in the socket to the second end of the strut, the fourth pressure path being a second AOA pressure path; wherein the strut is monolithic such that the third opening, the fourth opening, the third pressure path, and the fourth pressure path are integral with the strut.

A probe head connected to the strut, wherein a first pressure-tight joint is between the first AOA opening and a first AOA pressure passage that extends through the probe head and a second pressure-tight joint is between the second AOA opening and a second AOA pressure passage that extends through the probe head.

Spaced bumps that extend inward from an inner surface of the sidewall of the socket prior to inserting a probe head into the socket.

The socket includes two rows of four spaced bumps.

The socket includes a hole that extends through the sidewall of the socket.

The strut includes a tab that extends out from the first end of the socket prior to brazing a probe head to the strut.

A mounting flange adjacent the second end of the strut, the mounting flange being integral with the strut; and a thermal gap adjacent the second end of strut, the thermal gap being an air gap that extends through the strut between the mounting flange and the first pressure path and the second pressure path such that the thermal gap extends around the first pressure path and the second pressure path inward from the mounting flange.

A groove extending into the strut from an exterior surface of the strut prior to brazing the heater to the strut; and a heater positioned within the groove; wherein the heater is externally brazed to the strut such that a braze makes up a portion of the exterior surface of the strut after brazing the heater to the strut.

The groove is angled such that a portion of the groove overhangs the heater prior to brazing the heater to the strut.

Spaced retaining portions that partially extend over the groove prior to brazing the heater to the strut.

Protrusions that extend outward from an exterior surface of the strut prior to brazing the heater to the strut.

An air data probe includes a probe head; a strut connected to the probe head, the strut comprising an angled groove extending into the strut; and an externally brazed heater positioned within the groove of the strut, wherein a braze makes up a portion of the exterior surface of the strut.

The air data probe of the preceding paragraph can optionally include, additionally and/or alternatively, any one or more of the following features, configurations and/or additional components:

The strut further comprises protrusions that extend outward from an exterior surface of the strut prior to brazing the heater to the strut.

The angled groove extends into the strut from an exterior surface of the strut prior to brazing the heater to the strut.

The strut further comprises a retaining portion that partially extends over the groove prior to brazing the heater to the strut, the heater being positioned within the groove such that a portion of the groove overhangs the heater prior to brazing the heater to the strut.

An air data probe includes a probe head; a strut connected to the probe head; a pressure path extending through the strut; a mounting flange connected to the strut, wherein the strut and the mounting flange are monolithic; and a thermal gap adjacent a second end of strut, the thermal gap being an air gap that extends through the strut between the mounting flange and the pressure path such that the thermal gap extends around the pressure path inward from the mounting flange.

The air data probe of the preceding paragraph can optionally include, additionally and/or alternatively, any one or more of the following features, configurations and/or additional components:

The strut further comprises a thermal isolation section connected to the bottom end of the mounting flange, wherein the thermal gap extends through the strut above the thermal isolation section.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A strut for an air data probe, the strut comprising:

a socket at a first end of the strut, the socket comprising:

a side wall; and an end wall connected to the sidewall;

a first opening in the socket extending through the end wall of the socket;

a second opening in the socket extending through the end wall of the socket and spaced from the first opening;

a first pressure path formed within the strut and extending within the strut from the first opening in the socket to a second end of the strut; and a second pressure path formed within the strut and extending within the strut from the second opening in the socket to the second end of the strut and spaced from the first pressure path;

wherein the strut is monolithic such that the socket, the first opening, the second opening, the first pressure path, and the second pressure path are integral to the strut.

2. The strut of claim 1, wherein the first opening is a pitot opening and the first pressure path is a pitot pressure path.

3. The strut of claim 2, wherein the second opening is a static opening and the second pressure path is a static pressure path.

4. The strut of claim 3, further comprising:

a third opening in the socket extending through the end wall of the socket and spaced from the first opening and the second opening, the third opening being a first AOA opening;

a fourth opening in the socket extending through the end wall of the socket and spaced from the first opening, the second opening, and the third opening and being a second AOA opening;

a third pressure path formed within the strut and extending within the strut from the third opening in the socket to the second end of the strut, the third pressure path being a first AOA pressure path; and a fourth pressure path formed within the strut and extending within the strut from the fourth opening in the socket to the second end of the strut, the fourth pressure path being a second AOA pressure path;

wherein the strut is monolithic such that the third opening, the fourth opening, the third pressure path, and the fourth pressure path are integral with the strut.

5. The strut of claim 4, further comprising a probe head connected to the strut, wherein a first pressure-tight joint is between the first AOA opening and a first AOA pressure passage that extends through the probe head and a second pressure-tight joint is between the second AOA opening and a second AOA pressure passage that extends through the probe head.

6. The strut of claim 1, wherein the strut includes spaced bumps that extend inward from an inner surface of the sidewall of the socket prior to inserting a probe head into the socket.

7. The strut of claim 6, wherein the socket includes two rows of four spaced bumps.

8. The strut of claim 1, wherein the socket includes a hole that extends through the sidewall of the socket.

9. The strut of claim 1, wherein the strut includes a tab that extends out from the first end of the socket prior to brazing a probe head to the strut.

10. The strut of claim 1, wherein the strut further comprises:

a mounting flange adjacent the second end of the strut, the mounting flange being integral with the strut; and a thermal gap adjacent the second end of strut, the thermal gap being an air gap that extends through the strut between the mounting flange and the first pressure path and the second pressure path such that the thermal gap extends around the first pressure path and the second pressure path inward from the mounting flange.

11. The strut of claim 1, wherein the strut further comprises:

a groove extending into the strut from an exterior surface of the strut prior to brazing the heater to the strut; and a heater positioned within the groove;

wherein the heater is externally brazed to the strut such that a braze makes up a portion of the exterior surface of the strut after brazing the heater to the strut.

12. The strut of claim 11, wherein the groove is angled such that a portion of the groove overhangs the heater prior to brazing the heater to the strut.

13. The strut of claim 11, wherein the strut further comprises spaced retaining portions that partially extend over the groove prior to brazing the heater to the strut.

14. The strut of claim 11, wherein the strut further comprises protrusions that extend outward from an exterior surface of the strut prior to brazing the heater to the strut.

* * * * *